(12) United States Patent
Howard et al.

(10) Patent No.: US 6,587,543 B1
(45) Date of Patent: Jul. 1, 2003

(54) SYSTEM AND METHOD FOR THE AUTOMATED TESTING OF A TELECOMMUNICATIONS SYSTEM

(75) Inventors: Robert Howard, Raytown, MO (US); Jack Johnson, Harrisonville, MO (US); Dave Hoover, San Luis Obispo, CA (US); Glenn Workinger, Garnett, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 10/101,036

(22) Filed: Mar. 19, 2002

Related U.S. Application Data

(63) Continuation of application No. 09/934,043, filed on Aug. 21, 2001.
(60) Provisional application No. 60/226,789, filed on Aug. 21, 2000.

(51) Int. Cl.[7] ................................. H04M 1/24
(52) U.S. Cl. ............... 379/10.01; 379/10.03; 379/9.04; 379/29.01; 379/1.02
(58) Field of Search ............ 379/13, 1.01, 9.01, 379/9.02, 9.03, 10.01, 10.02, 10.03, 15.01, 15.02, 1.02, 27.04, 29.01, 29.1

(56) References Cited

U.S. PATENT DOCUMENTS

| | | | |
|---|---|---|---|
| 4,910,760 A | * 3/1990 | Reformato | 379/13 |
| 5,021,997 A | * 6/1991 | Archie et al. | 379/9.01 |
| 5,504,753 A | 4/1996 | Renger et al. | |
| 5,528,748 A | 6/1996 | Wallace | |
| 5,572,570 A | 11/1996 | Kuenzig | |
| 5,729,588 A | * 3/1998 | Chin et al. | 379/14 |
| 5,835,565 A | 11/1998 | Smith et al. | |
| 5,878,113 A | 3/1999 | Bhusri | |
| 5,933,475 A | 8/1999 | Coleman | |
| 5,987,633 A | * 11/1999 | Newman et al. | 379/15 |
| 6,014,424 A | 1/2000 | Thai | |
| 6,031,990 A | 2/2000 | Sivakumar et al. | |
| 6,091,802 A | 7/2000 | Smith et al. | |
| 6,272,208 B1 | * 8/2001 | Kasrai | 379/15 |
| 6,366,645 B1 | * 4/2002 | Khuc et al. | 379/13 |

OTHER PUBLICATIONS

Hammer Technologies, Inc., Hammer System Release Notes—Release 2.5, Jun. 2000, Revision A, United States of America.

* cited by examiner

Primary Examiner—Rexford Barnie
(74) Attorney, Agent, or Firm—Harley R. Ball; Steven J. Funk; Kevin D. Robb

(57) ABSTRACT

A system and method for the automated testing of a telecommunications system. In operation, the automated test system may be used to test the functionality of telephony applications residing on telecommunications equipment and to validate the data contained within related databases. In an exemplary embodiment, the automated test system is used to test the functionality of an automated messaging system and the accuracy of associated call detail records (CDR) located within a CDR database. A capture/playback tool is preferably used to emulate the interaction of a test person on a workstation of the test system to thereby automate the testing process.

31 Claims, 11 Drawing Sheets

SYSTEM AND METHOD FOR THE AUTOMATED TESTING OF A TELECOMMUNICATIONS SYSTEM

CROSS-REFERENCE TO RELATED APPLICATIONS

This application is a Continuation of U.S. patent application Ser. No. 09/934,043, filed on Aug. 21, 2001, which is based on U.S. Provisional Application Serial No. 60/226,789, filed on Aug. 21, 2000, which are incorporated herein by reference.

STATEMENT REGARDING FEDERALLY SPONSORED RESEARCH OR DEVELOPMENT

Not Applicable.

BACKGROUND OF THE INVENTION

1. Field of the Invention

The present invention relates generally to the testing of a telecommunications system, and more particularly to the automated testing of telecommunications equipment and related databases of a telecommunications system.

2. Description of Related Art

A telephone company central office will generally include various types of telecommunications equipment that are used to process calls routed through the central office. Examples of such telecommunications equipment include a local user switch, a host computer, and various voice response units ("VRUs"). The calls routed through the central office may consist of voice signals routed between human users, data signals routed between machines (e.g., facsimile machines or computers), or voice/data signals routed between a human user and a machine (e.g., a VRU). Typically, the details of each of these calls are logged into a call detail record ("CDR") located in a CDR database residing on either the local user switch or the host computer. The CDRs are then forwarded to a data processing center where the data is periodically processed to prepare customer billings.

Over the last decade, automated test equipment has been developed that can be programmed to run a variety of different tests for the purpose of testing the functionality of telephony applications residing on the telecommunications equipment. In operation, the automated test equipment transmits voice and/or data signals to the telecommunications equipment in such a manner as to simulate the types of calls that are typically routed through the central office. The automated test equipment then detects and evaluates the response voice and/or data signals produced by the telecommunications equipment to determine if the telephony applications are operating properly.

As an example, automated test equipment has been used to test the functionality of automated messaging systems in which calls are routed through the local user switch to a particular VRU. In a typical test scenario, the test equipment places an outbound call to a particular automated messaging system to determine if the switch routes the call to the appropriate VRU (e.g., the VRU assigned to an airline reservation system). The test equipment then detects whether the VRU plays the expected audio greeting and prompt (e.g., "Thank you for calling ABC Airlines. Please select from the following options. For flight arrival and departure times, press 1. For domestic reservations and fares, press 2. For international reservations and fares, press 3. For all other calls, please stay on the line."). Then, the test equipment runs a calling script that tests each available option of the automated messaging system to determine whether the call is routed to the appropriate destination. In this manner, the test equipment is able to test the functionality of the automated messaging system with minimal involvement from a test person.

While automated test equipment has greatly improved the testing of telephony applications residing on telecommunications equipment, it has not been capable of validating the data stored within related databases that is generated as a result of the tests. Instead, for example, after one or more test calls have been run on the telecommunications equipment, the CDRs located in the CDR database are typically checked on a manual basis. To do so, a test person must log into a Workstation, access the CDR database, enter a command to retrieve the appropriate CDR associated with a particular test call, and visually check the fields of the CDR to determine if the call details were properly logged into the CDR database. As can be appreciated, the process of manually checking the accuracy of every CDR for every test call placed during a test session can be a very tedious, time consuming, and inefficient process. In addition, because the checking of the CDRs is done by a test person, the test results are prone to human errors. Therefore, there is a need for an automated test system that can be used not only to test the functionality of telephony applications residing on telecommunications equipment, but also to validate the data contained within related databases.

BRIEF SUMMARY OF THE INVENTION

The present invention is directed to a system and method for the automated testing of a telecommunications system that can be used to test the functionality of telephony applications residing on telecommunications equipment and to validate the data contained within related databases that is generated as a result of the tests. Preferably, the system and method utilize a capture/playback tool programmed to emulate the interaction of a test person on a workstation of the test system by recording and replaying keystrokes and mouse point-and-click actions on the workstation for purposes of automating the testing process. In an exemplary embodiment, the automated test system is used to test the functionality of an automated messaging system and the accuracy of associated CDRs located in a CDR database.

In an exemplary test configuration, the automated test system is connected to a system-under-test via a communication network. The system-under-test includes a local user switch, a host computer, and a plurality of VRUs. Residing on the host computer is a CDR database. The automated test system includes a workstation, telecommunications test equipment, and a server. Residing on the server are a plurality of software applications and databases, including a test manager, a capture/playback tool, testing software for the telecommunications test equipment, and a test results database.

In operation, a test person logs into the workstation of the automated test system and opens the test manager. At this point, a list of all possible tests that can be run on the system-under-test appears on the screen of the workstation. The test person views the list and selects one or more tests to be run. The test person also enters the desired date and time for the selected tests to be run.

When it is the correct date and time to start the selected tests, the test manager is programmed to retrieve the test scripts for the selected tests from the capture/playback database. Preferably, there is a separate test script for each of the selected tests. As such, the number of test scripts retrieved from the capture/playback database will equal the number of selected tests.

Next, the test manager is programmed to direct the capture/playback software to execute the test script for each of the selected tests. For each test script executed, the capture/playback software is programmed to start a new session within the CDR database, and type the appropriate command to retrieve the current date and time from the CDR database clock. This date and time is then used to formulate a query that, when entered later on, will retrieve the CDR from the CDR database that corresponds with the test calls that are about to be run. The capture/playback software then minimizes the session within the CDR database.

Next, the capture/playback software is programmed to notify the test manager that the test is starting. The capture/playback software then directs the testing software of the telecommunications test equipment to run various calling scripts that are designed to test the functionality of the automated messaging system. The results of these test calls are logged to the test results database.

The capture/playback software is programmed to then re-open the session within the CDR database and hit "enter" to run the query formulated above and retrieve the CDR from the CDR database that corresponds with the test calls. The CDRs retrieved from the CDR database are compared against a CDR reference retrieved from the capture/playback database, and the results of this comparison are logged into the test results database. The capture/playback software is programmed to then notify the test manager that the test is complete.

The test manager is programmed to compile all of the test results written to the test results database and check if any of the tests failed. If they did, the test manager logs the test results into the test results database as an overall fail. On the other hand, if none of the tests failed, the test manager logs the test results into the test results database as an overall pass.

The present invention will be better understood from the following detailed description of the invention, read in connection with the drawings as hereinafter described.

DETAILED DESCRIPTION OF THE INVENTION

The present invention is directed to a system and method for the automated testing of a telecommunications system through the use of a capture/playback tool. In an exemplary embodiment, the automated test system is used to test the functionality of an automated messaging system and the accuracy of associated CDRs located in a CDR database. While the present invention will be described in detail hereinbelow with reference to this exemplary embodiment, it should be understood that the invention could be used to test the functionality of any telephony application residing on telecommunications equipment and to validate the data contained within any related database that is generated as a result of the tests.

Figure 1:
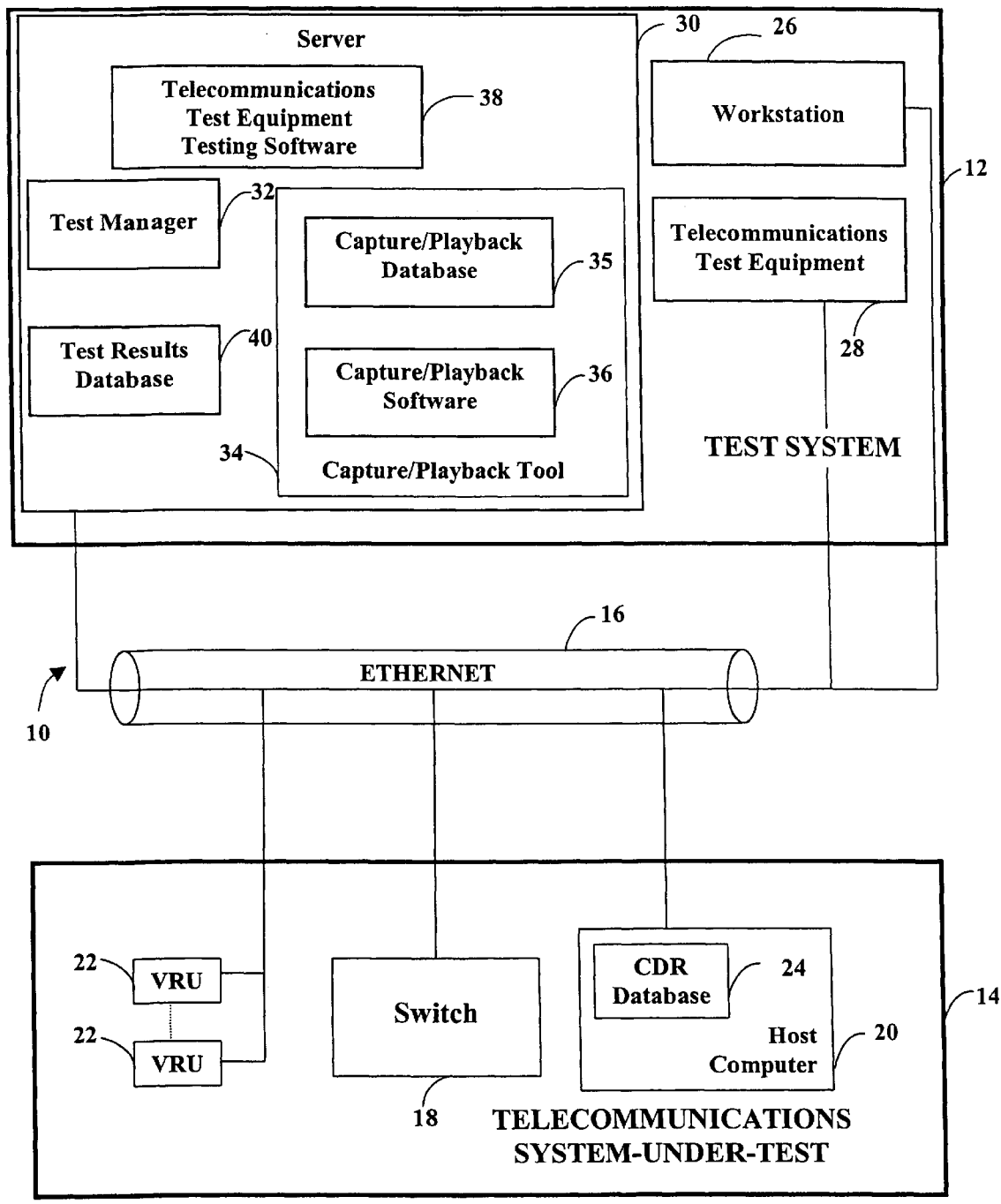
FIG. 1 is a block diagram of a test system connected to a telecommunications system-under-test via a communication network, in accordance with an exemplary embodiment of the present invention.

Referring to FIG. 1, an exemplary embodiment of a test configuration in accordance with the present invention is designated generally as reference numeral 10. Test configuration 10 includes a test system 12 connected to a telecommunications system 14 via a communication network 16. Telecommunications system 14 will hereinafter be referred to as the "system-under-test."

In the embodiment shown in FIG. 1, system-under-test 14 includes a local user switch 18, a host computer 20, and a plurality of VRUs 22. System-under-test 14 could also include many other types of telecommunications equipment, as is known in the art. As such, local user switch 18, host computer 20, and VRUs 22 are merely included by way of example, and not by way of limitation, in order to facilitate the explanation of the various tests that can be performed by test system 12. It should be understood that the telecommunications equipment of system-under-test 14 include both hardware and software elements that together support a variety of telephony applications.

Local user switch 18 may comprise any type of switch that is capable of processing voice and data signals. In operation, switch 18 functions to route a call to its appropriate destination, such as to a particular VRU 22. In the illustrated embodiment, switch 18 does not have resident intelligence, but instead utilizes the external intelligence of host computer 20. An example of such a switch is the SDS-1000 switch sold by Summa Four, Inc. Alternatively, a switch with resident intelligence could also be used, thereby eliminating the need for a host computer. Examples of such a switch include the ESS™ family of switches sold by AT&T Network Systems, and, the DMS family of switches sold by Nortel Networks.

Host computer 20 may comprise any type of mainframe computer that is capable of performing a database lookup to instruct local user switch 18 where to route a call. Examples of such a computer include the Tandem K-1000 computer sold by Compaq Computer Corporation, the RS/6000 computer sold by IBM, and the HP 9000 computer sold by Hewlett-Packard Company. In the illustrated embodiment, host computer 20 includes a CDR database 24 that contains the CDRs for all of the calls routed through local user switch 18. Of course, it should be apparent that if a switch with resident intelligence is used, CDR database 24 would reside on that switch. CDR database 24 will hereinafter be referred to as the "database-under-test."

VRUs 22 may comprise any type of voice response units that are capable of receiving and processing DTMF and/or voice signals for an automated messaging system. Examples of such VRUs are the voice response units sold by Brite Voice Systems. It should be understood that although two VRUs are shown in the illustrated embodiment, a system-under-test will typically include several VRUs.

Looking still to FIG. 1, test system 12 of the illustrated embodiment includes a workstation 26, telecommunications test equipment 28, and a server 30. Residing on server 30 are a plurality of software applications and databases, each of which will be described in detail hereinbelow. Server 30 and workstation 26 preferably operate in a client-server environment, wherein workstation 26 operates as the "client" and server 30 operates as the "server." As such, the software applications and databases residing on server 30 can be run on workstation 26 via communication network 16.

Workstation 26 may comprise any type of personal computer that is capable of operating under the control of an operating system, such as the Windows NT® operating system sold by Microsoft Corporation. Workstation 26 preferably includes a graphical user interface ("GUI"). As will be seen, the software applications residing on server 30 are automatically run on workstation 26 via the GUI interface during the course of the testing process.

Telecommunications test equipment 28 may comprise any type of test equipment that, when used in connection with testing software 38 (discussed hereinbelow), is capable of testing the functionality of telephony applications residing on telecommunications equipment. As is known in the art, test equipment 28 will typically include a plurality of "originating party" channels and a plurality of "terminating party" channels. Examples of such test equipment include the Hammer testing system sold by Hammer Technologies, the Sage 930 testing system sold by Sage Instruments, the Chameleon Protocol Analyzer sold by Tekelec, Inc., and the AM2 Niagara® and Crescendo® testing systems sold by Ameritec.

Server 30 may comprise any type of server that operates under the control of an operating system, such as the Windows NT® operating system sold by Microsoft Corporation. An example of such a server is the ProLiant® server sold by Compaq Computer Corporation. As discussed above, a plurality of software applications and databases reside on server 30, including: a test manager 32; a capture/playback tool 34; testing software 38 for telecommunications test equipment 28; and a test results database 40. It should be understood, of course, that the software applications and/or databases could alternatively reside on different servers. Preferably, the software applications and databases are written in a high-level computer language that is well-suited to the client-server environment. An example of a computer language that is particularly well-suited to the present invention is the Visual Basic® object-oriented programming language sold by Microsoft Corporation.

The function of each of the software applications and databases residing on server 30 will now be described in greater detail.

Test manager 32 is generally used to schedule and control the execution of all of the tests to be run on system-under-test 14 and database-under-test 24. As will be seen, these tests may include tests designed to test the functionality of telephony applications residing on the telecommunication equipment and/or to validate the data contained within related databases that is generated as a result of the tests. An example of software that could be programmed to perform this function is the Microsoft Access® software sold by Microsoft Corporation. Other types of software could also be used, such as the Oracle® software sold by Oracle Corporation and the SQL software sold by Sybase, Inc.

Capture/playback tool 34 includes both a capture/playback database 35 and capture/playback software 36. Capture/playback database 35 is generally used to store a plurality of test scripts that are used to run the tests on system-under-test 14 and database-under-test 24. Capture/playback software 36 is generally used to control the execution of these test scripts. Preferably, capture/playback software 36 is programmed to record and replay keystrokes and mouse point-and-click actions on workstation 26 for the purpose of automating the testing process. Also, capture/playback software 36 preferably utilizes embedded objects, as opposed to screen X-Y coordinates, to emulate the interaction of the test person on workstation 26. An example of a capture/playback tool that is particularly well-suited to the present invention is the QARun® software sold by Compuware Corporation. Of course, any tool having capture/playback capabilities could alternatively be used, such as the WinRunner® software sold by Mercury Interactive Corporation or the AutoTester® software sold by AutoTester, Inc.

The utilization of capture/playback tool 34 to automate the testing process has several advantages. First, the manual validation of data that was necessary in prior test systems is no longer required, thereby conserving employee resources. Also, because the test person has minimal involvement in the testing process, the test results are less prone to human errors. In addition, it is not necessary for the test person to have a high degree of programming skill.

As discussed above, testing software 38 can be run on telecommunications test equipment 28 to test the functionality of telephony applications residing on the telecommunications equipment of system-under-test 14. In the illustrated embodiment, testing software 38 resides on server 30 so as to be accessible by multiple workstations. However, it should be understood that testing software 38 could alternatively reside on workstation 26. Testing software 38 preferably includes a plurality of different calling scripts that, when executed, are able to run a variety of different tests on the telecommunications equipment of system-under-test 14.

One type of test that could be run on the telecommunications equipment is a "validation test." In this test, testing software 38 is used to validate the functionality of a new hardware or software feature of the telecommunications equipment. In a related test, testing software 38 can be used to test whether the newly added hardware or software feature has a negative impact on the functionality of existing hardware and software features of the telecommunications equipment. This test is known as a "regression test."

Another type of test that could be run on the telecommunications equipment is a "stress test." In this test, testing software 38 is used to place a plurality of outbound calls to system-under-test 14 for the purpose of testing the operation of the telephony applications residing on the telecommunications equipment under a maximum load condition. In another test, testing software 38 can be used to place various outbound calls to system-under-test 14 for the purpose of testing how different call mixes affect the overall performance of the telephony applications residing on the telecommunications equipment. This test is known as a "performance test."

Yet another type of test that could be run on the telecommunications equipment is a "fault tolerance test." In this test, testing software 38 is used to simulate errors in the hardware or software features of the telecommunications equipment for the purpose of testing how telephony applications residing on the telecommunications equipment perform during a switchover to redundant equipment.

It should be understood that the above-described tests are merely examples of the types of tests that could be run to test the functionality of telephony applications residing on the telecommunications equipment of system-under-test 14.

Test results database 40 is generally used to store the results of all of the tests run on system-under-test 14 and database-under-test 24. An example of database software that could be programmed to perform this function is the Microsoft Access® software sold by Microsoft Corporation. Other types of software could also be used, such as the Oracle® software sold by Oracle Corporation and the SQL software sold by Sybase, Inc.

Looking still to FIG. 1, communication network 16 is provided to route voice and/or data signals between workstation 26, telecommunications test equipment 28, server 30, local user switch 18, host computer 20, and the various VRUs 22. In the illustrated embodiment, these components communicate with each other via an Ethernet network. Of course, other types of communication networks could alternatively be used, such as a token ring network, an ATM network, or any other type of local or wide area network.

Referring now to FIGS. 2–8, a series of flow charts are provided to illustrate an example of how test system 12 can be used to test system-under-test 14 and database-under-test 24. In the illustrated example, test system 12 is used to test both the functionality of an automated messaging system and the accuracy of associated CDRs located in CDR database-under-test 24. It should be understood that the following is provided merely by way of example, and not by way of limitation, in order to facilitate the explanation of the operation of test system 12.

Figure 2A:
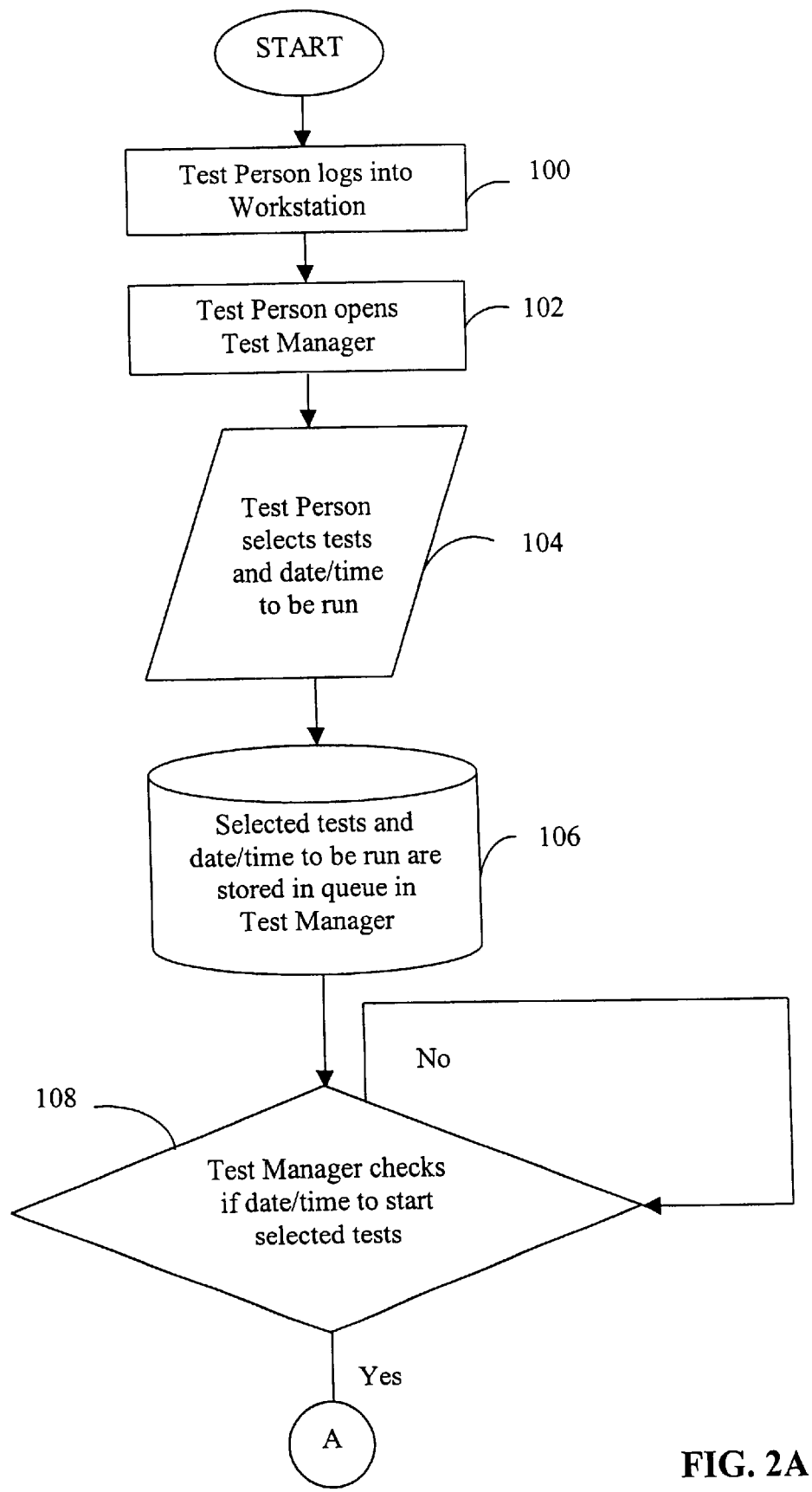
FIG. 2 is a flow chart of the steps performed during the testing of the telecommunications system-under-test of FIG. 1.
Figure 2B:
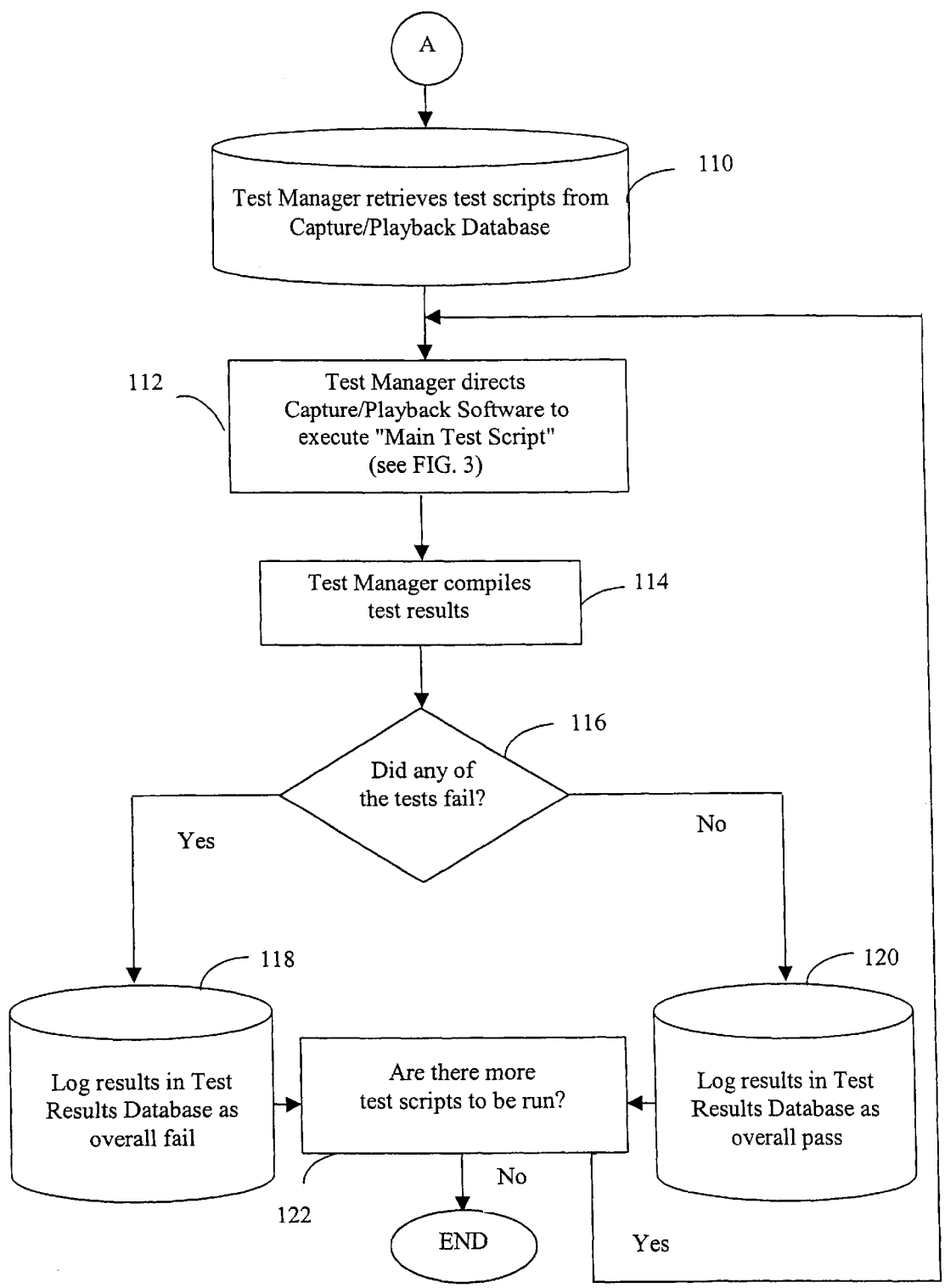

Looking to FIG. 2, a flow chart is provided that illustrates all of the steps performed during the testing of system-under-test 14 and database-under-test 24. In step 100, a test person logs into workstation 26, either directly or from a remote computer using communications software, such as the pcAnywhere software sold by Symantec Corporation. In step 102, the test person opens test manager 32 on workstation 26. At this point, a list of all possible tests that can be run on system-under-test 14 appears on the screen of workstation 26. In step 104, the test person views the list and selects one or more tests to be run. The test person also enters the desired date and time for the selected tests to be run.

In step 106, the selected tests and associated date and time to be run are stored in a queue in test manager 32. In step 108, test manager 32 checks the clock on workstation 26 to determine if it is the correct date and time to start the selected tests. If it is not the correct date and time, test manager 32 continues to check the clock on workstation 26. If it is the correct date and time, test manager 32 proceeds to step 110.

In step 110, test manager 32 retrieves the test scripts for the selected tests to be run from capture/playback database 35. Preferably, there is a separate test script for each of the selected tests to be run. As such, the number of test scripts retrieved from capture/playback database 35 will equal the number of selected tests to be run.

In step 112, test manager 32 directs capture/playback software 36 to execute the "Main Test Script" for the first of the selected tests to be run. As will be described in greater detail hereinbelow with reference to FIG. 3, the "Main Test Script" runs various tests on system-under-test 14 and database-under-test 24, updates test manager 32 regarding the status of the tests, and logs the results of the tests to test results database 40.

In step 114, test manager 32 compiles the test results written to test results database 40. In step 116, test manager 32 checks if any of the tests failed. If they did, test manager 32 logs the test results into test results database 40 as an overall fail in step 118. On the other hand, if none of the tests failed, test manager 32 logs the test results into test results database 40 as an overall pass in step 120.

In step 122, test manager 32 checks if there are more test scripts to be run. If there are, steps 112–122 are repeated for each additional test script. On the other hand, if there are no more test scripts to be run, the test session will end.

Figure 3A:
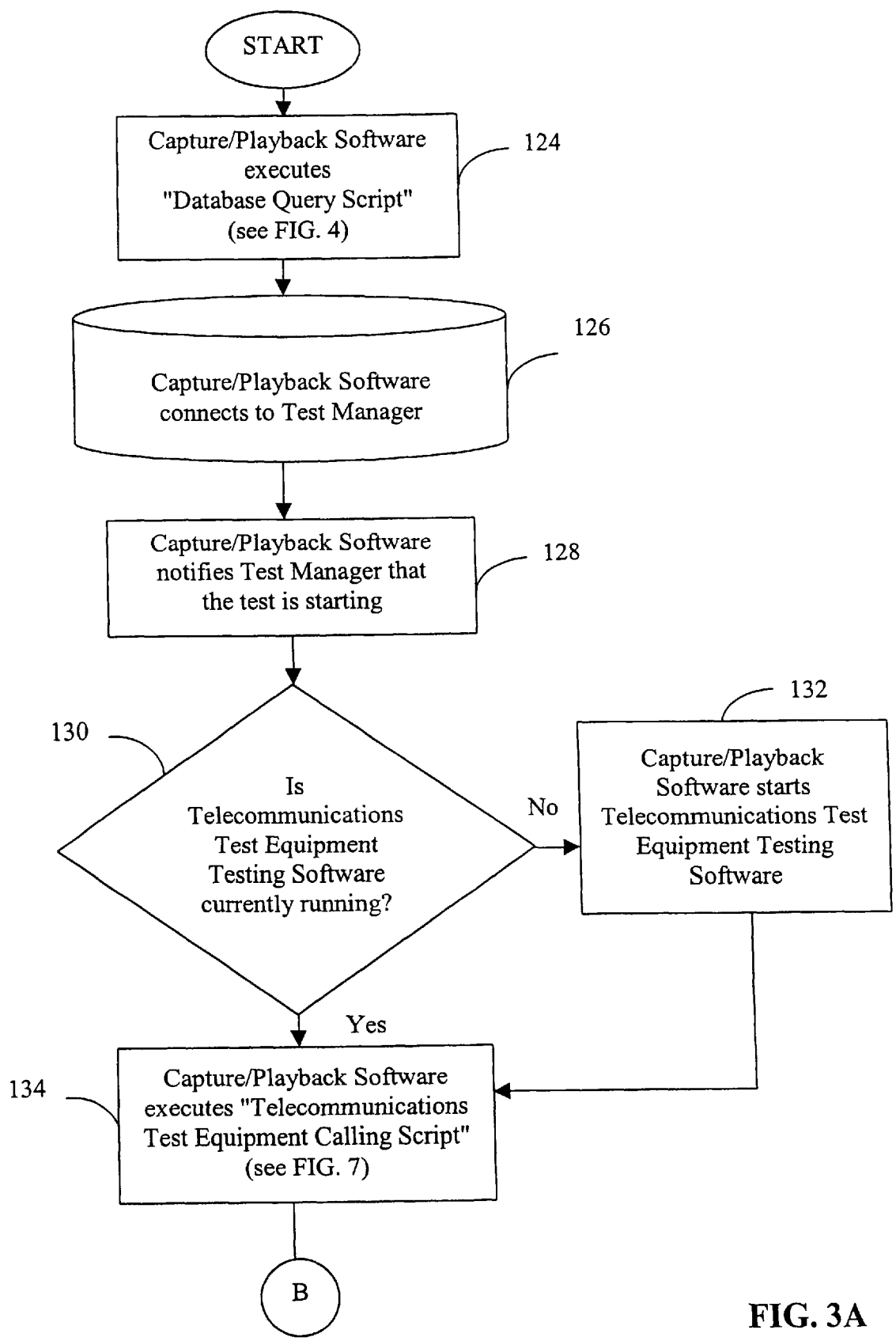
FIG. 3 is a flow chart of the "Main Test Script" of FIG. 2.
Figure 3B:
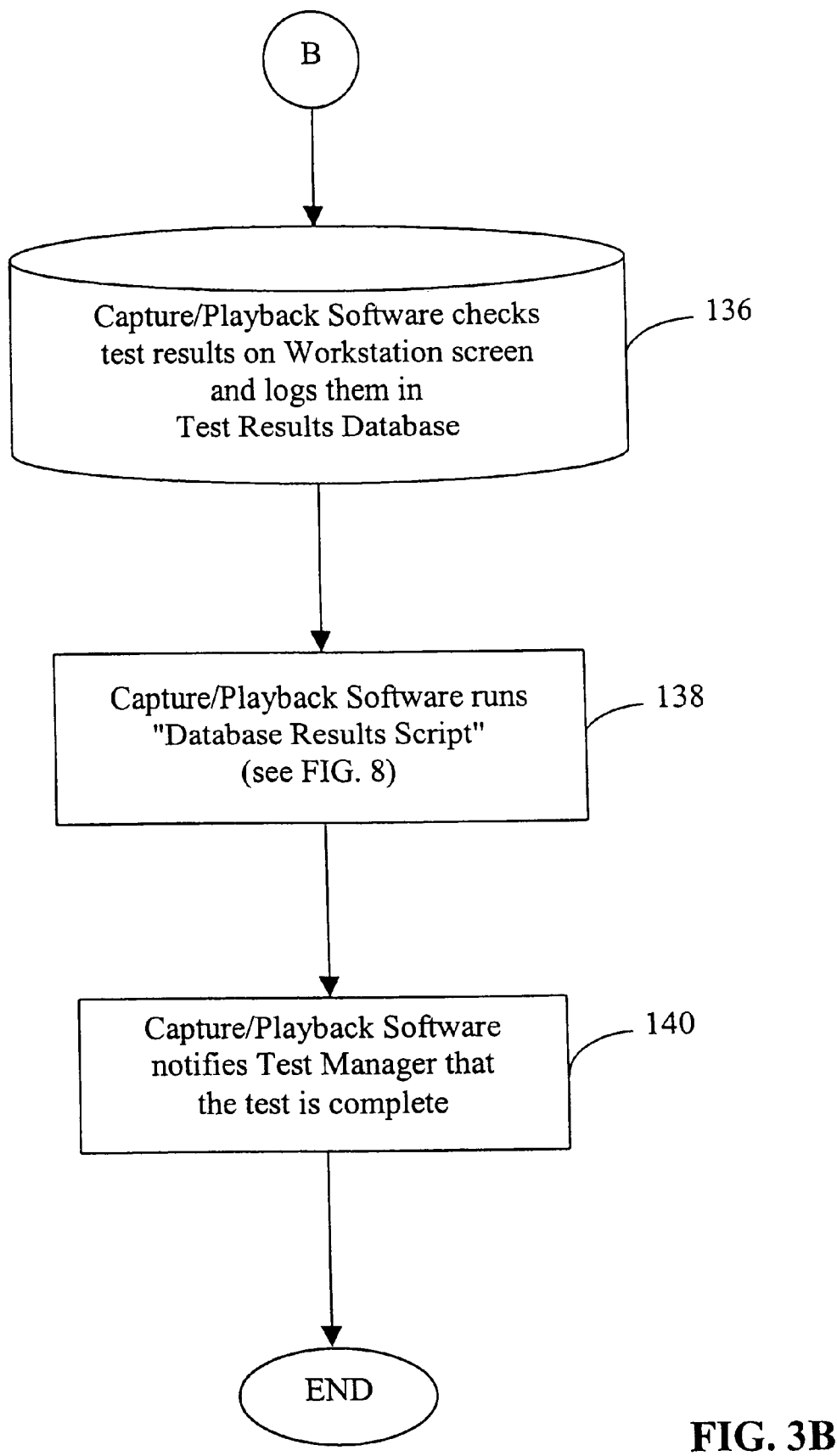

Turning now to FIG. 3, a flow chart is provided that illustrates the execution of the "Main Test Script" by capture/playback software 36 (as discussed generally above with reference to step 112 of FIG. 2). As will be seen, the "Main Test Script" is designed to test the functionality of an automated messaging system and the accuracy of associated CDRs located in CDR database-under-test 24.

In step 124, capture/playback software 36 executes a "Database Query Script." As will be described in greater detail hereinbelow with reference to FIG. 4, the "Database Query Script" starts a new session within CDR database-under-test 24 and formulates and types (but does not enter) a query designed to retrieve the CDR from CDR database-under-test 24 that is associated with the test call to be run in steps 130–136.

In step 126, capture/playback software 36 connects to test manager 32 in order to log into the test status queue. In step 128, capture/playback software 36 notifies test manager 32 that the test is starting.

In step 130, capture/playback software 36 checks if testing software 38 of telecommunications test equipment 28 is currently running. If not, capture/playback software 36 starts testing software 38 in step 132. Then, in step 134, capture/playback software 36 executes a "Telecommunications Test Equipment Calling Script." If testing software 38 is currently running, capture/playback software 36 goes directly to the execution of the "Telecommunications Test Equipment Calling Script" in step 134. As will be described in greater detail hereinbelow with reference to FIG. 7, the "Telecommunications Test Equipment Calling Script" places a test call to test the functionality of the automated messaging system. In step 136, capture/playback software 36 checks the test results of the "Telecommunications Test Equipment Calling Script" on the screen of workstation 26 and logs them into test results database 40.

In step 138, capture/playback software 36 executes a "Database Results Script." As will be described in greater detail hereinbelow with reference to FIG. 8, the "Database Results Script" enters the query that was formulated in step 124, retrieves the CDR from CDR database-under-test 24 that is associated with the test call run in steps 130–136, compares the retrieved CDR against a reference CDR to determine if the call details were properly logged into CDR database-under-test 24, and logs the test results into test results database 40.

Finally, in step 140, capture/playback software 36 notifies test manager 32 that the test is complete.

Figure 4:
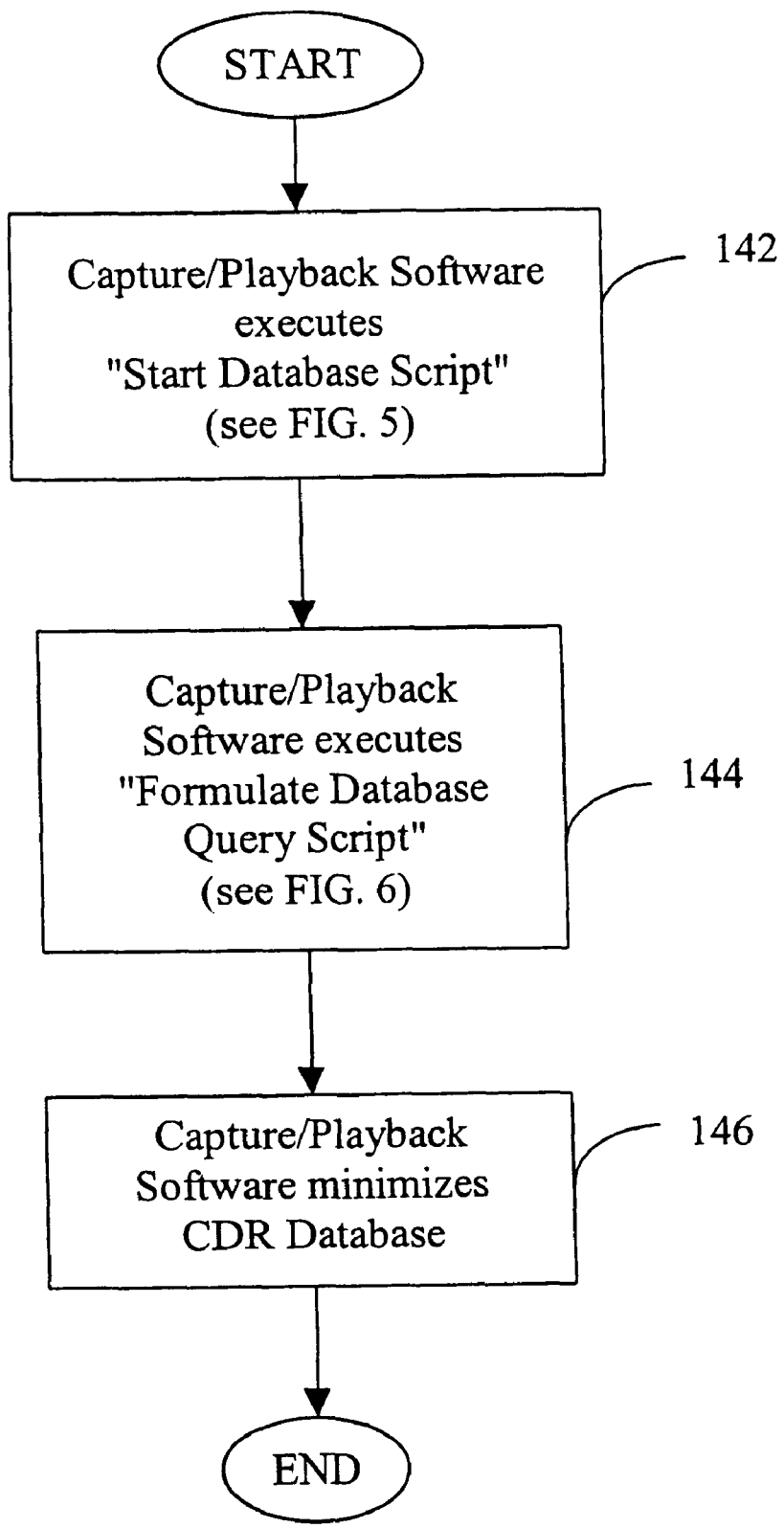
FIG. 4 is a flow chart of the "Database Query Script" of FIG. 3.

Turning now to FIG. 4, a flow chart is provided that illustrates the execution of the "Database Query Script" by capture/playback software 36 (as discussed generally above with reference to step 124 of FIG. 3). In step 142, capture/playback software 36 executes a "Start Database Script." As will be described in greater detail hereinbelow with reference to FIG. 5, the "Start Database Script" opens a new session within CDR database-under-test 24. Next, in step 144, capture/playback software 36 executes a "Formulate Database Query Script." As will be discussed in greater detail hereinbelow with reference to FIG. 6, the "Formulate Database Query Script formulates and types (but does not enter) a query designed to retrieve the CDR from CDR database-under-test 24 that is associated with the test call run in steps 130–136 of FIG. 3. Finally, in step 146, capture/playback software 36 minimizes the session that has been opened within CDR database-under-test 24.

Figure 5:
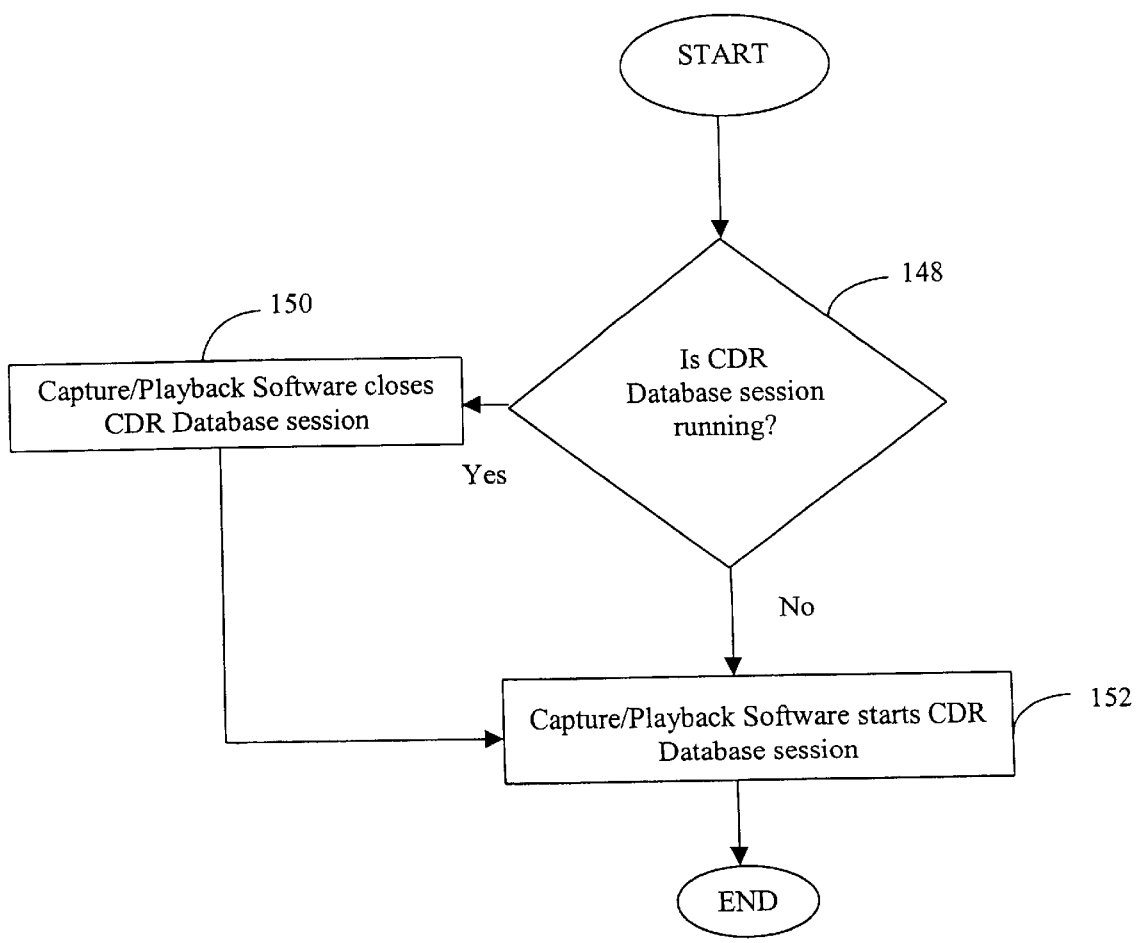
FIG. 5 is a flow chart of the "Start Database Script" of FIG. 4.

Turning now to FIG. 5, a flow chart is provided that illustrates the execution of the "Start Database Script" by capture/playback software 36 (as discussed generally above with reference to step 142 of FIG. 4). In step 148, capture/playback software 36 checks to see if a session within CDR database-under-test 24 is running. If it is, capture/playback software 36 closes the session in step 150, and then starts a new session in step 152. If not, capture/playback software 36 goes directly to the start of a new session in step 152.

Figure 6:
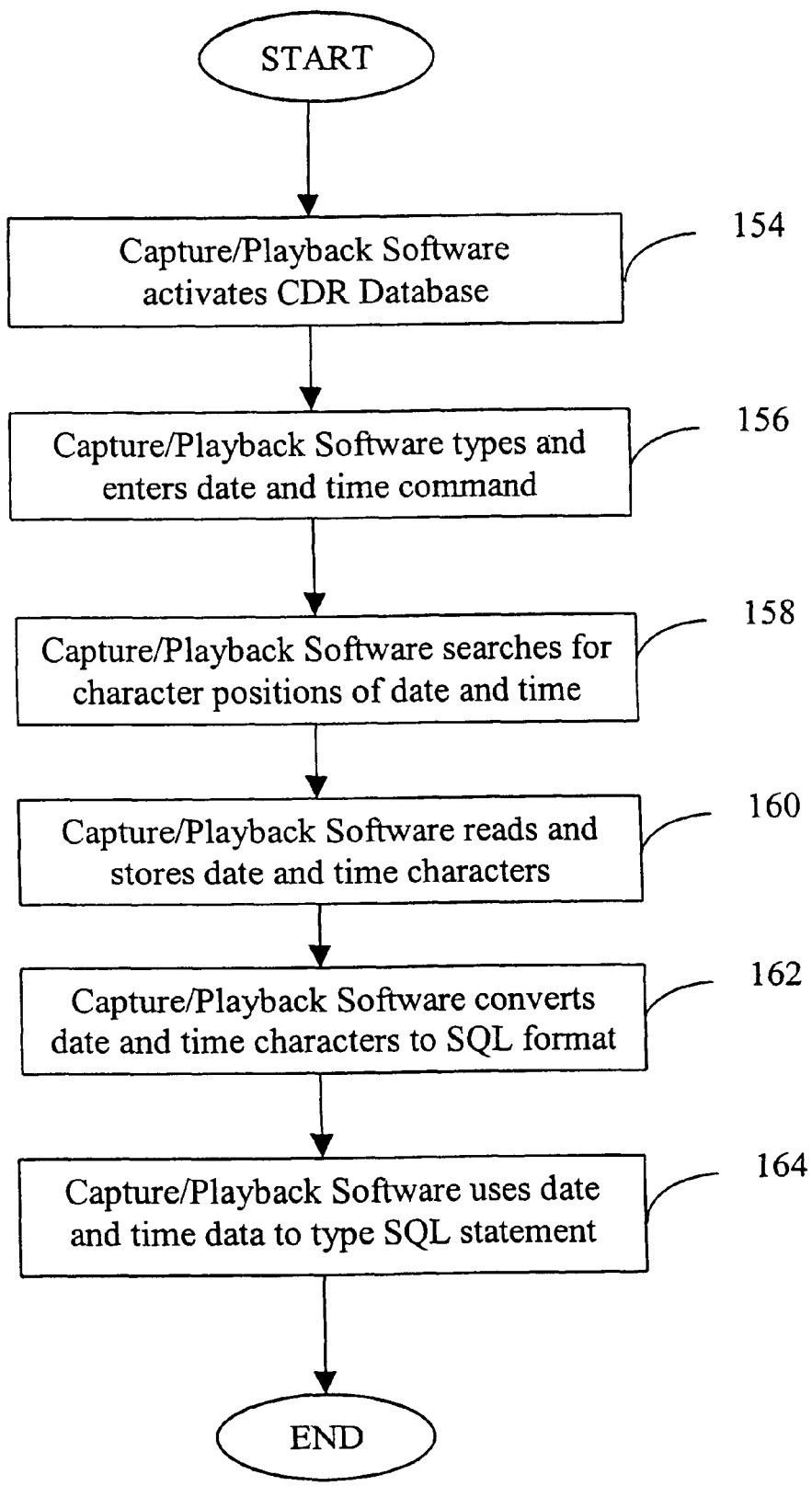
FIG. 6 is a flow chart of the "Formulate Database Query Script" of FIG. 4.

Turning now to FIG. 6, a flow chart is provided that illustrates the execution of the "Formulate Database Query Script" by capture/playback software 36 (as discussed generally above with reference to step 144 of FIG. 4). In step 154, capture/playback software 36 activates the window of CDR database-under-test 24 and clears the screen of workstation 26. In step 156, capture/playback software 36 types and enters the command to retrieve the current date and time from the clock of CDR database-under-test 24. Alternatively, if the clocks of server 30 and CDR database-under-test 24 are synchronized, capture/playback software 36 may retrieve the current date and time from the clock of server 30. The current date and time then appears on the screen of workstation 26.

In step 158, capture/playback software 36 searches for the character positions of the retrieved date and time on the screen of workstation 26. The character positions of the date and time may be located, for example, by searching for the comma before the year. In step 160, capture/playback software 36 reads the located date and time characters from the screen of workstation 26 and stores them in an appropriate format. For example, the date and time characters may be stored as "dy" for day, "mon" for month, and "yr" for year.

In step 162, capture/playback software 36 converts the stored date and time characters to a format that is compatible with CDR database-under-test 24. Preferably, the stored date and time characters are converted to an SQL format, which is compatible with host computer 20. Finally, in step 164, capture/playback software 36 uses the converted date and time characters to formulate a query that, when entered, will retrieve the CDR from CDR database-under-test 24 that corresponds to that particular date and time. If the date and time characters have been converted to an SQL format, this query is known as an SQL statement.

Figure 7A:
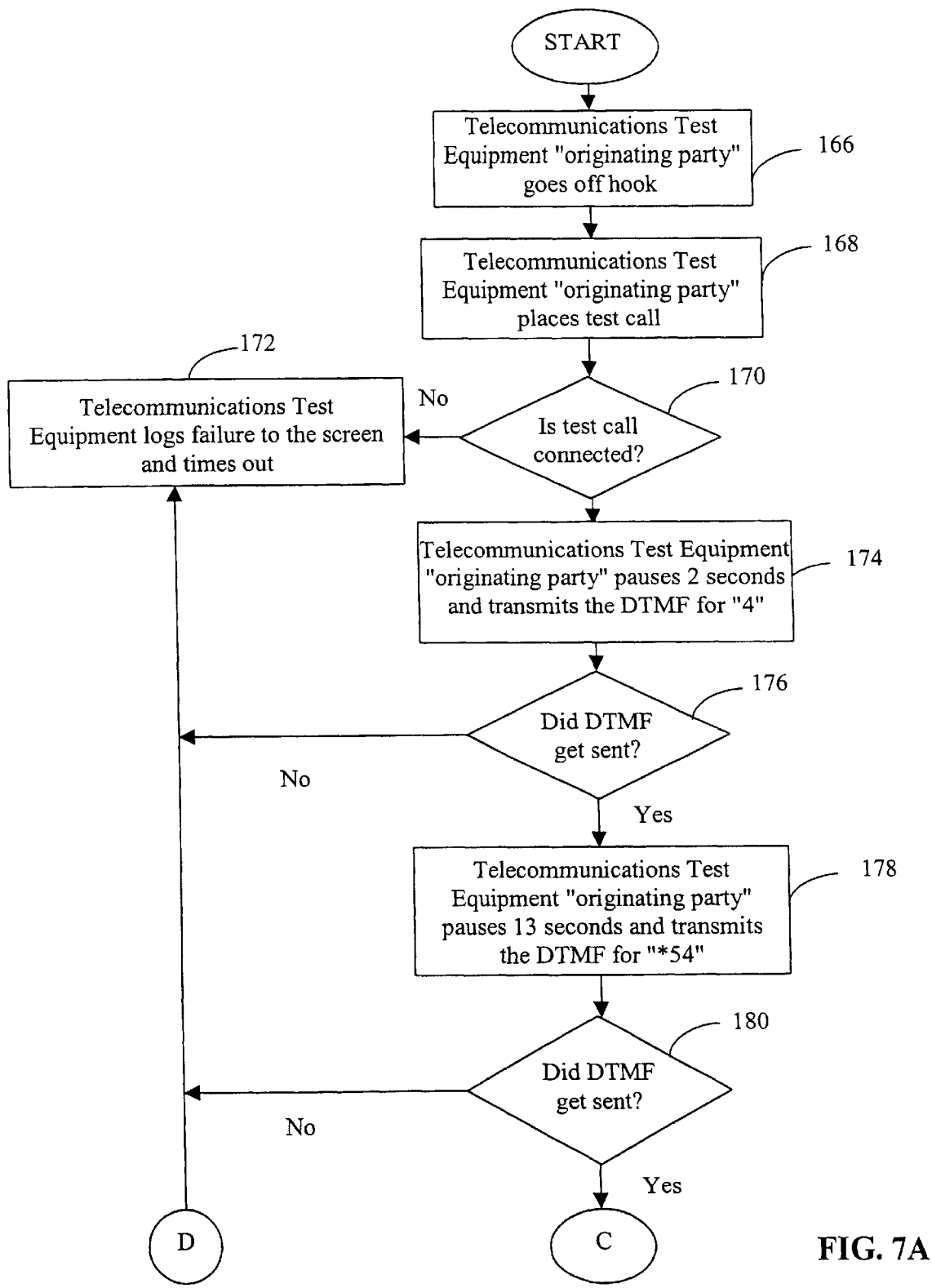
FIG. 7 is a flow chart of the "Telecommunications Test Equipment Calling Script" of FIG. 3.
Figure 7B:
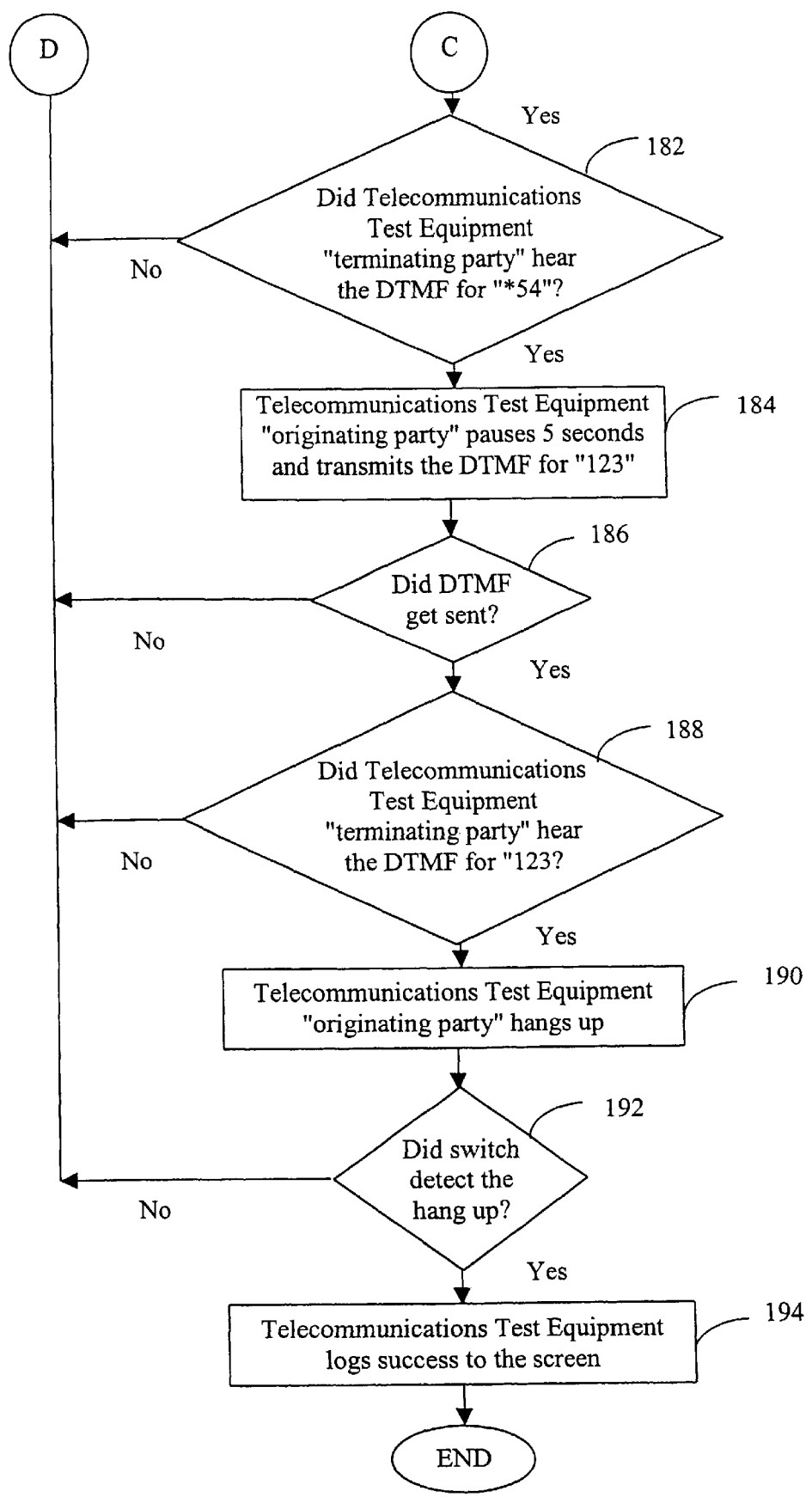

Turning now to FIG. 7, a flow chart is provided that illustrates the execution of the "Telecommunications Test Equipment Calling Script" by capture/playback software 36 (as discussed generally above with reference to step 134 of FIG. 3). As will be seen, the "Telecommunications Test Equipment Calling Script" is designed to test the functionality of the automated messaging system.

In step 166, an "originating party" channel of telecommunications test equipment 28 goes off hook. In step 168, telecommunications test equipment 28 places a test call to the automated messaging system through the "originating party" channel (i.e., to simulate the placement of a call by a user). In step 170, telecommunications test equipment 28 checks if the test call was connected. If the test call is not connected, telecommunications test equipment 28 logs a failure to the screen of workstation 26 and times out in step 172. If the test call is connected, telecommunications test equipment 28 pauses 2 seconds and transmits the DTMF for "4" over the "originating party" channel in step 174 (i.e., to simulate a user selecting option 4 in response to an audio greeting and prompt, which transfers the user to a call center).

In step 176, telecommunications test equipment 28 checks if the DTMF for "4" was sent. If the DTMF for "4" was not sent, telecommunications test equipment 28 logs a failure to the screen of workstation 26 and times out in step 172. If the DTMF for "4" was sent, the telecommunications test equipment 28 pauses 13 seconds and transmits the DTMF for "*54" over the "originating party" channel in step 178 (i.e., to simulate the establishment of an initial voice path between the user and the call center).

In step 180, telecommunications test equipment 28 checks if the DTMF for "*54" was sent. If the DTMF for "*54" was not sent, telecommunications test equipment 28 logs a failure to the screen of workstation 26 and times out in step 172. If the DTMF for "*54" was sent, telecommunications test equipment 28 checks if a "terminating party" channel of telecommunications test equipment 28 heard the DTMF for "*54" in step 182. If the DTMF for "*54" was not heard, telecommunications test equipment 28 logs a failure to the screen of workstation 26 and times out in step 172. If the DTMF for "*54" was heard, the telecommunications test equipment 28 pauses 5 second and sends the DTMF for "123" over the "originating party" channel in step 184 (i.e., to simulate the maintenance of the voice path between the user and the call center).

In step 186, telecommunications test equipment 28 checks if the DTMF for "123" was sent. If the DTMF for "123" was not sent, telecommunications test equipment 28 logs a failure to the screen of workstation 26 and times out in step 172. If the DTMF for "123 " was sent, telecommunications test equipment 28 checks if the "terminating party" channel of telecommunications test equipment 28 heard the DTMF for "123" in step 188. If the DTMF for "123" was not heard, telecommunications test equipment 28 logs a failure to the screen of workstation 26 and times out in step 172. If the DTMF for "123" was heard, the "originating party" channel of telecommunications test equipment 28 hangs up in step 190.

In step 192, telecommunications test equipment 28 checks if local user switch 18 detected the hang up. If the switch did not detect the hang up, telecommunications test equipment 28 logs a failure to the screen of workstation 26 and times out in step 172. If the switch did detect the hang up, telecommunications test equipment 28 logs a success to the screen of workstation 26 in step 194.

Figure 8:
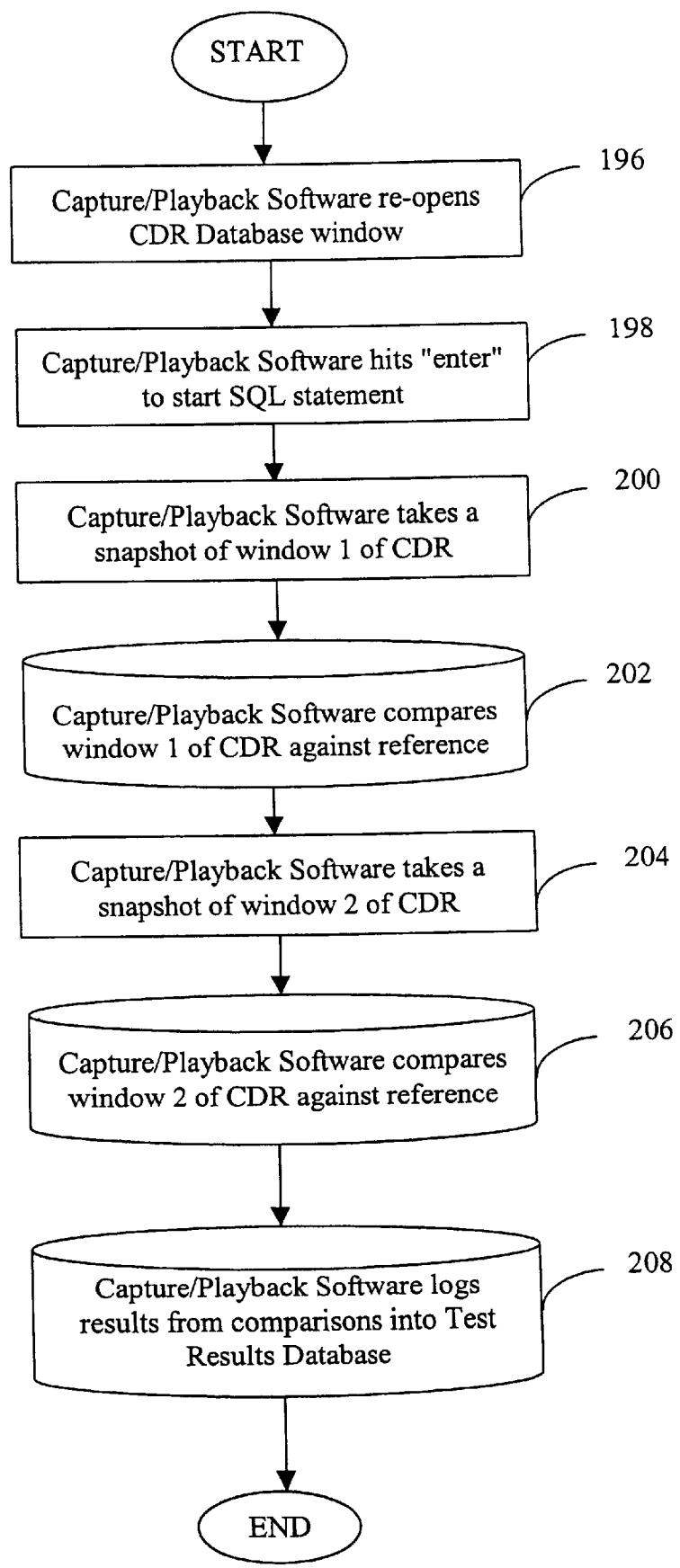
FIG. 8 is a flow chart of the "Database Results Script" of FIG. 3.

Turning now to FIG. 8, a flow chart is provided that illustrates the execution of the "Database Results Script" by capture/playback software 36 (as discussed generally above with reference to step 138 of FIG. 3). As will be seen, the "Database Results Script" is designed to validate the accuracy of associated CDRs located in CDR database-under-test 24.

In step 196, capture/playback software 36 re-opens the window for the session within CDR database-under-test 24. In step 198, capture/playback software 36 hits "enter" to start the query or SQL statement that was previously typed in step 164 of FIG. 6. This SQL statement will retrieve the CDR from CDR database-under-test 24 for that particular date and time. At this point, the CDR is displayed on the screen of workstation 26.

In step 200, capture/playback software 36 takes a snapshot of window 1 of the CDR. In step 202, capture/playback software 36 compares window 1 of the CDR against a CDR reference for window 1 that is stored in capture/playback database 35. In step 204, capture/playback software 36 takes a snapshot of window 2 of the CDR. In step 206, capture/playback software 36 compares window 2 of the CDR against a CDR reference for window 2 that is stored in capture/playback database 35. Of course, if the CDR includes additional windows, those windows will be compared against a CDR reference for those windows as well. Finally, in step 208, capture/playback software 36 logs the results from the comparisons into test results database 40.

It should be understood that the flow charts of FIGS. 2–8 above are provided merely as an example of how test system 12 can be used to test the functionality of an automated messaging system and the accuracy of associated CDRs located in CDR database-under-test 24. Of course, it should be apparent to those skilled in the art that these flow charts could be easily modified to test the functionality of any telephony application residing on the telecommunications equipment of system-under-test 14 and to validate the data contained within any related database.

While the present invention has been described and illustrated hereinabove with reference to an exemplary embodiment, it should be understood that various modifications could be made to this embodiment without departing from the scope of the present invention. For example, test system 12 could be used to validate data contained within other databases of system-under-test 14, such as databases containing call activity reports or maintenance logs. Therefore, the present invention is not to be limited to the specific test system and method disclosed hereinabove, except insofar as such limitations are included in the following claims.

What is claimed and desired to be secured by Letters Patent is as follows:

1. A method of automatically testing a telecommunications system, the system including telecommunications equipment and a related database-under-test, comprising the steps of:
   (a) storing a test script in a database of a test system;
   (b) retrieving the test script from the database of the test system; and
   (c) executing the test script to automatically control the substeps of:
      (c1) transmitting a test signal to telecommunications equipment;
      (c2) detecting a response signal produced by the telecommunications equipment in response to the test signal;
      (c3) evaluating the response signal to determine whether the telecommunications equipment is operating properly;
      (c4) accessing a database-under-test;
      (c5) retrieving data logged into the database-under-test in response to steps (c1) and (c2);
      (c6) evaluating the data to determine whether the data was properly logged into the database-under-test.

2. The method of claim 1, wherein step (c) is performed by a capture/playback tool of the test system.

3. The method of claim 1, wherein step (c) is monitored and controlled by a test manager of the test system.

4. The method of claim 1, further comprising step (c7) of writing test results from steps (c3) and (c6) to a test results database of the test system.

5. The method of claim 1, wherein steps (c1)–(c3) are repeated until the telecommunications equipment is fully tested.

6. The method of claim 1, wherein the evaluation in step (c6) is performed by comparing the data retrieved in step (c5) with reference data to determine whether the data was properly logged into the database-under-test.

7. The method of claim 1, wherein steps (a) and (b) comprise storing and retrieving a plurality of test scripts, and wherein step (c) is repeated for each of the plurality of test scripts.

8. The method of claim 1, wherein the telecommunications equipment comprises an automated messaging system, and wherein the database-under-test comprises a call detail record (CDR) database.

9. A method of automatically testing a telecommunications system, the system including telecommunications equipment and a call detail records (CDR) database, comprising the steps of:
   (a) storing a test script in a database of a test system;
   (b) retrieving the test script from the database of the test system; and
   (c) executing the test script to automatically control the substeps of:
      (c1) placing a test call to telecommunications equipment to determine whether the telecommunications equipment is operating properly;
      (c2) retrieving a CDR associated with the test call from a CDR database to determine whether the CDR was properly logged into the CDR database.

10. The method of claim 9, wherein step (c) is performed by a capture/playback tool of the test system.

11. The method of claim 9, wherein step (c) is monitored and controlled by a test manager of the test system.

12. The method of claim 9, further comprising step (c3) of writing test results from steps (c1) and (c2) to a test results database of the test system.

13. The method of claim 9, wherein step (c1) comprises the substeps of transmitting a test signal to the telecommunications equipment, detecting a response signal produced by the telecommunications equipment in response to the test signal, and evaluating the response signal to determine whether the telecommunications equipment is operating properly.

14. The method of claim 9, wherein step (c2) comprises the substeps of accessing the CDR database, retrieving a CDR associated with the test call from the CDR database, and evaluating the CDR to determine whether the CDR was properly logged into the CDR database.

15. The method of claim 14, wherein the evaluation is performed by comparing the CDR retrieved from the CDR database with a reference CDR to determine whether the CDR was properly logged into the CDR database.

16. The method of claim 9, wherein steps (a) and (b) comprise storing and retrieving a plurality of test scripts, and wherein step (c) is repeated for each of the plurality of test scripts.

17. The method of claim 9, wherein the telecommunications equipment is an automated messaging system.

18. A method of automatically testing a telecommunications system, the system including an automated messaging system and a call detail records (CDR) database, comprising the steps of:
   (a) storing a test script in a database of a test system;
   (b) retrieving the test script from the database of the test system; and
   (c) executing the test script to automatically control the substeps of:
      (c1) transmitting a test signal to an automated messaging system;

(c2) detecting a response signal produced by the automated messaging system in response to the test signal;

(c3) evaluating the response signal to determine whether the automated messaging system is operating properly;

(c4) accessing a CDR database;

(c5) retrieving a CDR logged into the CDR database in response to steps (c1) and (c2);

(c6) comparing the CDR to a reference CDR to determine whether the CDR was properly logged into the CDR database;

(c7) writing test results from steps (c3) and (c6) to a test results database of the test system.

19. The method of claim 18, wherein step (c) is performed by a capture/playback tool of the test system.

20. The method of claim 18, wherein step (c) is monitored and controlled by a test manager of the test system.

21. The method of claim 18, wherein steps (c1)–(c3) are repeated until the automated messaging system is fully tested.

22. The method of claim 18, wherein steps (a) and (b) comprise storing and retrieving a plurality of test scripts, and wherein step (c) is repeated for each of the plurality of test scripts.

23. A test system for automatically testing a telecommunication system, the telecommunications system including telecommunications equipment and a related database-under-test, comprising:

(a) a test manager programmed to monitor and control the execution of a test script;

(b) a capture/playback tool, operatively coupled to the test manager, programmed to execute the test script to automatically place a test call to the telecommunications equipment to determine whether the telecommunications equipment is operating properly and retrieve data associated with the test call from the database-under-test to determine whether data is being properly logged into the database-under-test; and (c) a test results database, operatively coupled to the test manager and the capture/playback tool, for storing test results from the execution of the test script.

24. The test system of claim 23 further comprising a workstation operatively coupled to the capture/playback tool in such a manner that the capture/playback tool executes the test script on the workstation.

25. The test system of claim 24, wherein the workstation has a graphical user interface.

26. The test system of claim 23 further comprising telecommunications test equipment adapted to determine whether the telecommunications equipment is operating properly.

27. The test system of claim 23, wherein the test manager, the capture/playback tool and the test results database are incorporated within a server of the test system.

28. The test system of claim 23, wherein the telecommunications equipment comprises an automated messaging system, and wherein the database-under-test comprises a call detail record (CDR) database.

29. A test system for automatically testing a telecommunication system, the telecommunications system including an automated messaging system and a call detail records (CDR) database, comprising:

(a) means for monitoring and controlling the execution of a test script;

(b) means for executing the test script to automatically place a test call to the automated messaging system to determine whether the automated messaging system is operating properly and retrieve a CDR associated with the test call from the CDR database to determine whether CDRs are being properly logged into the CDR database; and (c) means for storing test results from the execution of the test script.

30. A test system for automatically testing a telecommunications system, the telecommunications system including an automated messaging system and a call detail records (CDR) database, comprising:

(a) a workstation;

(b) telecommunications test equipment adapted to determine whether an automated messaging system is operating properly; and (c) a server programmed to:
(i) monitor and control the execution of at least one test script;
(ii) execute the at least one test script to automatically place a test call to the automated messaging system to determine whether the automated messaging system is operating properly and retrieve a CDR associated with the test call from the CDR database to determine whether data is being properly logged into the CDR database, wherein the server is operatively coupled to the workstation in such a manner that the server executes the at least one test script on the workstation;
(iii) store test results from the execution of the test script.

31. The test system of claim 30, wherein testing software of the telecommunications test equipment resides on the server.

* * * * *